United States Patent [19]

Brauns

[11] 4,244,732

[45] Jan. 13, 1981

[54] MANUFACTURE OF STEEL FROM ORES CONTAINING HIGH PHOSPHOROUS AND OTHER UNDESIRABLE CONSTITUENTS

[75] Inventor: Frank E. Brauns, Alta Loma, Calif.

[73] Assignees: Kaiser Engineers, Inc., Oakland, Calif.; Societe Nationale de Siderurgie, Algiers, Algeria

[21] Appl. No.: 24,410

[22] Filed: Mar. 27, 1979

[51] Int. Cl.³ .................................................. C21B 11/00
[52] U.S. Cl. .................................................. 75/38; 75/6
[58] Field of Search .................. 75/38, 21, 24, 33, 34, 75/40, 43, 44 R, 48, 6, 7, 8, 9

[56] References Cited

U.S. PATENT DOCUMENTS

| | | | |
|---|---|---|---|
| 519,901 | 5/1894 | Barton | 75/6 |
| 890,233 | 6/1908 | Jones | 75/33 |
| 1,299,072 | 4/1919 | Walker | 75/46 |
| 1,846,234 | 2/1932 | van Royen | 75/48 |
| 2,014,873 | 9/1935 | Wildman | 75/33 |
| 2,028,105 | 1/1936 | Head | 75/37 |
| 2,266,816 | 12/1941 | Ruzicka | 75/30 |
| 2,871,115 | 1/1959 | Agarwal | 75/3 |

Primary Examiner—M. J. Andrews
Attorney, Agent, or Firm—Naylor, Neal & Uilkema

[57] ABSTRACT

The production of relatively low phosphorous, semifinished steel from blended presized granules of high phosphorous iron ore and limestone, directly and selectively reducing the iron oxide to sponge iron and calcined lime with the current of hot reducing gases in a shaft furnace, charging heated granules directly to a melting furnace to obtain semifinished steel and slagging off phosphorous and other undesirable components and thereafter refining the semifinished steel in a conventional electric furnace.

8 Claims, 2 Drawing Figures

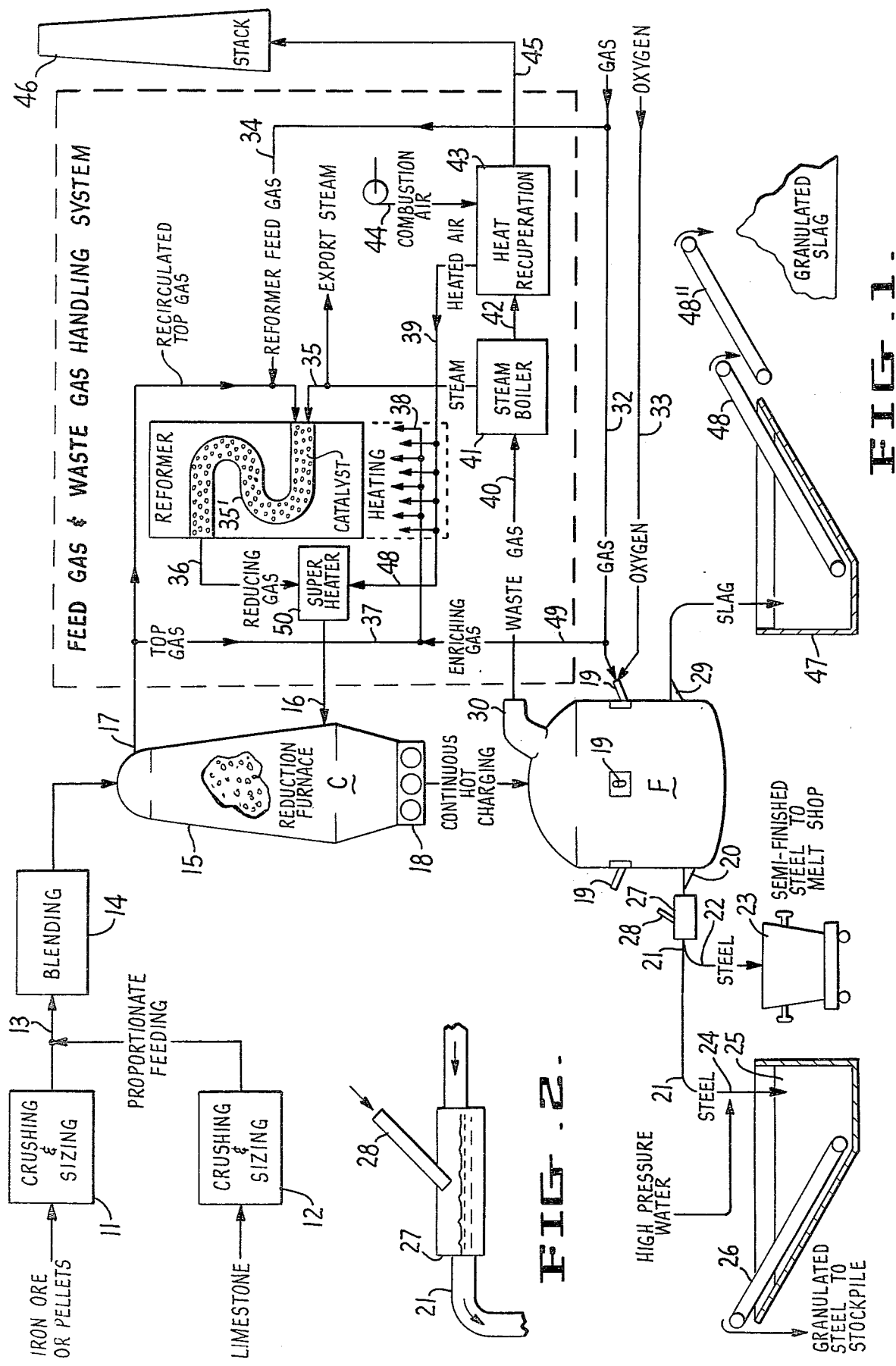

MANUFACTURE OF STEEL FROM ORES CONTAINING HIGH PHOSPHOROUS AND OTHER UNDESIRABLE CONSTITUENTS

BACKGROUND OF THE INVENTION

1. Field of the Invention

This invention relates to the production of fully refined steel from high phosphorous iron ores. It is well known that phosphorous is a contaminant in steel making and has a deleterious effect on nearly every grade of steel. Conventional processes for steel making cannot use high phosphorous iron ores without substantially increasing the cost of manufacture.

In steel making processes wherein high phosphorus ores are charged to the blast furnace and the hot metal produced in the blast furnace is then sent on to a basic oxygen furnace, or open hearth furnace, or electric furnace for refining into finished steel, the phosphorous is not removed in the blast furnace and remains in the hot metal. Accordingly, it is necessary to use more complicated and expensive refining methods such as double slagging, that materially increases the cost of steel manufacture and reduces the capacity of the steelmaking facility. This same problem of carry over of the phosphorous into the refining furnace exists when high phosphorous ores are used in direct reduction processes, wherein sponge iron is produced as an intermediate product and is then charged to a refining furnace such as an electric furnace or induction furnace or the like. Accordingly, none of the prior art processes in use today enable a steel maker to effectively remove phosphorous in the slag during the refining because the phosphorous is reduced and remains in the steel.

SUMMARY OF INVENTION

The process of this invention produces relatively low phosphorous semifinished steel from high phosphorous iron ore, which semifinished steel can be readily refined into finished steel. It is characterized by the fact that high phosphorous iron ores, which ordinarily are objectionable, can be utilized without unduly complicating the steel making operation. By the process blended presized granules of high phosphorous iron ore and limestone are directly reduced in a shaft-type furnace through which hot reducing gases flow and the iron oxides are reduced to at least 75% metallic iron (sponge iron), and the limestone is calcined to calcium oxide. The granules of sponge iron and calcium oxide are continuously fed through a high temperature melting furnace where metallic iron is melted and the calcined limestone forms a slag into which the phosphorous oxides are fluxed and stablized to thereby produce a low phosphorous semifinished steel. This steel is then suitable for conversion into fully refined steel of negligible phosphorous content by conventional electric furnaces and the like.

DESCRIPTION OF THE DRAWINGS

In the drawings:

FIG. 1 is a flow sheet of a preferred embodiment of the invention showing the essential steps of reducing the iron oxide to sponge iron, recovering semifinished steel from such sponge iron in a hot melting furnace, and a gas system for preparing hot reducing gases and recovering waste gases in a manner compatible with the aforementioned reduction and melting system.

FIG. 2 is a schematic drawing of an arrangement for injecting carbon into semifinished steel intended for further refinement.

DETAILED DESCRIPTION OF THE PREFERRED EMBODIMENT

In the embodiment of the present invention disclosed herein iron ore of relatively high phosphorous content is crushed and sized in any conventional manner to obtain pieces ranging between $\frac{1}{8}''$ and $\frac{3}{4}''$ and preferably about $\frac{1}{2}''$. Relatively high phosphorous ore is considered ore having a phosphorous content of 0.200 percent or higher. In like manner limestone is crushed and sized to approximately the same size. In the accompanying flowsheet of FIG. 1 these operations take place at 11 and 12 respectively and then are intermingled in the proportions desired for the fed to the reduction furnace at 13 in the feed system. The ore and limestone are homogenized in blender 14, according to the process.

Although the system described herein is one primarily intended for use with crushed granulated ore and pelletized ore, it is particularly useful for ores having high quantities of phosphorous, that is, amounts in excess of that desired for feed to conventional ironmaking or steelmaking furnaces. The term "granules" as used herein is intended to include pellets, pieces and particles of iron ore or of such ore after blending with limestone as described herein, and such granules are within the size range also described herein.

By the present system, the blended iron ore and limestone are introduced at the top of reduction furnace 15, which is a conventional refractory-lined shaft furnace wherein heated reducing gas R is introduced at 16 in the lower region of furnace 15 and is vented at 17 in the uppermost region of the furnace. The gas reformer system from which the reducing gases R originate, is designed to be compatible with the reduction furnace operation and the ore to be reduced therein, and will be described further on in this specification. The temperature of the reducing gas R is about 1000° C. when it enters furnace 15.

Necessarily the iron ore and limestone charge C must be sized particles or agglomerates that will keep their shape under heat and load as they pass through the furnace, and will not decrepitate or soften so as to clog the furnace or interfere with the permeability of the furnace burden as the gases pass upwardly through the charge. The charge enters the top zone of the furnace through a conventional seal arrangement and is heated as it descends through the furnace to discharge at the bottom at about 1050° C. As the charge descends the iron ore is converted to sponge iron by reaction of the reduction gases with the oxide content of the iron ore. During the reduction of the iron ore, the limestone is calcined from calcium carbonate to calcium oxide. However, the oxides of phosphorous are not reduced to any great extent as these temperatures and therefore exit the reduction furnace in essentially oxidized mineral form.

A typical residence time of charge C in the furnace ranges from three to five hours depending on the reducibility of the ores which are being treated. The sponge iron, (or reduced ore) is discharged from the reduction furnace at 18. At this point the iron ore is 80 to 95% metallized. At the point of discharge, mechanism 18 controls the rate of discharge and is designed to break up sintered masses. The material is fed directly to melting furnace F maintained at a substantially higher temperature than direct reduction furnace 15. A series of oxygen/gas burners 19 increase the reactor or melting furnace temperature to about 1650° C., wherein the iron and limestone ingredients are melted and converted from solids to liquids. The reaction furnace is designed to liquify the charge in the absence of carbon, or other reducing agents so as not to reduce the phosphorous or other undesirable elements in the oxide form. The lime serves to flux the silica, alumina and other gangue oxides as well as the phosphorous oxides to produce a slag of the proper viscosity at furnace temperature to effect a clean separation of the slag from the metallic bath. The molten metallic bath extracted from reactor F at spout 20 will be a low carbon, low phosphorous steel of approximately 0.30% carbon and 0.050% phosphorous. The molten steel passes through runner 21 and 22 where graphite or other forms of carbon are injected to raise the carbon level of the steel to between 0.20% and 0.70% suitable for feed to a steelmaking furnace via ladle 23. Alternatively, the molten steel from the innoculating vessel 27 can be routed to a granulation pit 25 for surge storage.

Although the foregoing melting furnace F is used to melt the material received from the direct reduction furnace so as to obtain a semifinished steel in molten form from which objectionable impurities have been removed, it is understood electric arc furnaces, induction furnaces and other types of furnaces can be used depending on local conditions, so long as they operate to perform the required functions.

The granulation can be effected by any conventional method, such as impacting the metal stream with high pressure water jets as is contemplated in the system shown in FIG. 1, wherein a high pressure spray is applied at 24 to particulate the steel into granule and permit it to drop by gravity into a receptacle 25 from which it is conveyed by a belt 26 to a stock pile for storage to be reclaimed for remelt or sale to the market.

The molten semifinished steel that is recovered in ladle 23 is generally transferred to an electric furnace or any other melting or alloying furnace as normally used in the steel making art, whereby steel refining is completed and the chemical composition of the desired alloy is fixed.

It is to be noted that the runner 21 is provided with a graphite injection unit 27, (also shown schematically in FIG. 2) whereby graphite is injected into the molten semifinished steel flowing from reactor F, wherein the carbon content of the molten steel is increased sufficiently to permit its further refinement as explained above in the electric furnace or other conventional furnaces for attaining finished steel of desired specification. More particularly by reference to FIG. 2 it will be noted that an inclined lance 28 is provided to inject the carbonaceous material into the molten steel in the quantities required. As is apparent, the innoculating vessel 27 is conveniently shaped as a rectangular trough with metal retention so that the molten steel can flow to the ladle or to the granulating pit, as above described.

The essential feature of this invention is the reactor which receives the hot sponge iron discharged from the direct reduction furnace. It is this unit which enables this system to utilize high phosphorous ores which are otherwise objectionable when used in conventional integrated steel plants and requires complicated refinement steps, double slagging and other expensive operations.

This continuous reaction wherein the phosphorous is separated from the metallic bath so that the steel may be refined in electric furnaces and other finishing vessels is operated in a neutral or slightly oxidizing atmosphere. Accordingly, a mixture of heating gas and oxygen must be adjusted so that no chemical reduction takes place. The slightly oxidizing atmosphere eliminates the possibility of an undesirable reducing atmosphere in the furnace.

The reactor F operates continuously to liquify the charge with the metal and slag discharged continuously at spouts 20 and 29 respectively, and the waste gases discharged continuously at the top of the vessel at vent 30, to flow to the waste recovery system.

Although other types of direct reduction furnaces (such as that known as the Purofer furnace) could be used to reduce the iron containing burden to a hot metallized charge for reactor F, the reduction furnace contemplated for this invention would be a shaft type furnace specifically designed to optimize the carbon level, temperature, and self-fluxing characteristics of the feed to reactor F so as to maximize the removal of phosphorous or other undesirable elements. These characteristics are important to the early formation of a fluid slag in the absence of carbon to effect the discharge of the phosphorous as a slag constituent and are not necessarily the characteristics of the conventional direct reduction furnaces.

The steel-making system of this invention is particularly useful where large quantities of natural gas, methane, or other gases are available for use as a reducing gas in the direct reduction unit C and a fuel gas for the semifinishing reactor F. Other sources of reducing gas can be used such as coke oven gas, producers gas, gasified coal, gasified lignite, etc. In each instance, the operating conditions of reduction furnace C and the effluent gas from reactor F would effect the type of "feed gas and waste gas handling system" employed in the practice of the invention.

In the invention disclosed in FIG. 1 herein, natural gas from supply line 32 is mixed with oxygen from supply line 33 at each of a series of suitably sized oxy-fuel burners 19 in proper proportion to produce a neutral or slightly oxidizing flame which will sustain a liquifying temperature of about 1650° C. in reactor F consistant with the feed rate of the hot charged material from reduction furnace C.

The "feed gas and waste gas handling system" depicted in FIG. 1, which system produces the reducing gas 16 going to the reduction furnace 15, reflects basically a "steam reforming" type system, but could alternatively be an "exothermic-endothermic" type reforming system wherein combusted gases from vent 30 of the reactor vessel F would be substituted for steam and mixed with the reformer feed gas from line 34 and recirculated top gas from line 17 to produce the alternative reducing gas in the externally heated catalyst tubes 35'. In the "steam reforming" type system shown herein, the hot waste gases from roof vent 30 are passed through steam boiler 41 via line 40 and thence through the heat recuperator 43 via line 42 finally to exit through line 45 to stack 46. In passing through steam boiler 41, most of the latent heat of the waste gas is given up to produce process steam and steam for export. As much as practical, of the remaining latent heat is extracted in recuperator 43 by the heating of combustion air for the process.

In the production of reducing gas for the "steam reforming" system depicted in FIG. 1, steam from line 35 is mixed with reformer feed gas from line 34 and recirculated top gas from line 17 in precisely controlled proportions and enters the externally heated tubes 35' packed with a suitable catalyst. As the mixture passes through the catalyst it is reformed to a gas composition of approximately 70% hydrogen and 25% carbon monoxide. The reducing gas as it exits the reformer through line 36 in between 800° and 900° C. and passes to the superheater 50 where it is partially combusted with heated air from line 48 to raise the temperature to 1100° C. or above, depending on the softening characteristics of the iron ore/limestone mixture, and enters reduction furnace C through line 16.

As the hot reducing gases pass through the burden of the reduction furnace, the entire mass is heated thereby calcining the limestone and accelerating the reduction of the iron oxides to metallic iron by the hydrogen and carbon monoxide as the gases flow countercurrently through the burden. One of the salient features of this invention is the higher than normal operating temperature for a given ore, permitted by the iron ore/limestone mixture wherein the limestone inhibits the sintering of masses and obstruction of the furnace throughput. This higher operating temperature which will vary between 850° C. and 1250° C. depending on the characteristics of the ore used, accelerates the reduction of the iron oxides and gives a greater superheat to the charge before it enters reactor F.

The top gas emerging at 17, composed principally of carbon dioxide and unconsumed hydrogen and carbon monoxide, is passed largely through lines 37 to burners 38 heating the catalyst tubes 35' of reformer R. A small portion of the top gas is fed through line 47 to be premixed with the reformer feed gases and steam. The top gases feeding burners 38 can be enriched with natural gas from line 49 if necessary. Heated air from the recuperator 43 serves as combustion air for the burners through line 39 as well as for partial combustion in superheater 50.

It is a feature of this invention that waste gases and other discharge materials apart from the slag from semifinishing reactor F are negligible.

With respect to the slag, it is to be noted that after discharge at 29 the slag is received in receptacle 47 and then passed along a series of belt conveyors 48 and 48", or the like and stored for ultimate use. Due to its relatively high phosphorous content the slag may be converted by a system to be otherwise disclosed into calcium phosphate fertilizers or other useful materials.

What is claimed is:

1. A process for producing relatively semifinished steel from iron oxide ores containing relatively high quantities of phosphorous oxides comprising the following steps:
   (a) blending presized granules of said high phosphorous iron ore and limestone;
   (b) feeding said ore and limestone to a reduction furnace to form a permeable bed therein and through which heated reducing gases at a temperature within the range of about 850° C. to 1250° C. are introduced to flow upwardly through said bed to reduce the iron oxides therein without reducing to any great extent the oxides of phosphorous contained in said ore to thereby convert said ore to sponge iron of at least 75 percent metallic iron;
   (c) passing said heated product of step (b) in solid form to a high temperature of at least 1650° C. wherein said metallic iron is melted to a liquid form and the heated partially calcined limestone forms a molten slag into which the phosphorous oxides are fluxed and stabilized, said melting being conducted in the absence of reducing agent so as not to reduce the phosphorous, thus effecting a separation from the metallic iron in the melt and producing a low phosphorous semifinished steel suitable for refining; and
   (d) recovering the semifinished steel for conversion into fully refined steel of neglible phosphorous content in conventional furnaces.

2. The process of claim 1 wherein said granules of iron ore and limestone range in size between ⅛ of an inch and ¾ of an inch.

3. The process of claim 1 wherein the reducing gases introduced into the reduction furnace are at a temperature of about 1000° C.

4. The process of claim 1 wherein said melting furnace is operated with a neutral to slightly oxidizing atmosphere.

5. The process of claim 1 wherein the residence time of the iron ore in the reduction furnace of step (b) ranges from three to five hours.

6. The process of claim 1 wherein the sponge iron discharged from the reduction furnace of step (b) ranges from at least about 75% to about 95% metallic iron.

7. The process of claim 1 wherein said high temperature melting furnace is heated by a series of burners to which oxygen and natural gas are supplied in proportions to produce a neutral to slightly oxidizing flame which will sustain a liquifying temperature of about 1650° C. in said furnace.

8. The process of claim 1 wherein said high temperature melting furnace is an electric furnace which will sustain a liquifying temperature of about 1650° C. in said furnace.

* * * * *